US010382466B2

(12) United States Patent
Ostergaard

(10) Patent No.: US 10,382,466 B2
(45) Date of Patent: Aug. 13, 2019

(54) COOPERATIVE CLOUD-EDGE VEHICLE ANOMALY DETECTION

(71) Applicant: HITACHI, LTD., Tokyo (JP)

(72) Inventor: Jeremy Ostergaard, Santa Clara, CA (US)

(73) Assignee: HITACHI, LTD., Tokyo (JP)

(*) Notice: Subject to any disclaimer, the term of this patent is extended or adjusted under 35 U.S.C. 154(b) by 189 days.

(21) Appl. No.: 15/449,693

(22) Filed: Mar. 3, 2017

(65) Prior Publication Data
US 2018/0255082 A1 Sep. 6, 2018

(51) Int. Cl.
*B60R 16/023* (2006.01)
*H04L 29/06* (2006.01)
(Continued)

(52) U.S. Cl.
CPC ...... *H04L 63/1425* (2013.01); *B60R 16/0231* (2013.01); *B60R 25/30* (2013.01); *G06N 20/00* (2019.01); *G08G 1/0112* (2013.01); *H04L 12/40176* (2013.01); *H04W 12/12* (2013.01); *G07C 5/008* (2013.01); *G07C 5/02* (2013.01); *G07C 5/08* (2013.01); *H04L 2012/40215* (2013.01); *H04L 2012/40273* (2013.01); *H04W 4/40* (2018.02)

(58) Field of Classification Search
CPC .............. H04L 63/1425; H04L 67/125; H04L 2012/40215; B60R 16/0231; B60R 25/30; H04W 12/12; H04W 4/40; G06N 99/005; G08G 1/0112; G05D 1/0061; G07C 5/08; G07C 5/02; G07C 5/008
See application file for complete search history.

(56) References Cited

U.S. PATENT DOCUMENTS 6,807,569 B1* 10/2004 Bhimani ............... G06F 21/577
    709/217
7,757,283 B2* 7/2010 Robert .................... H04L 43/00
    726/11
(Continued)

FOREIGN PATENT DOCUMENTS

EP  2 892 199 A1   7/2015
EP  3 113 529 A1   1/2017
(Continued)

OTHER PUBLICATIONS

Sandeep Nair Narayanan, "Using Data Analytics to Detect Anomalous States in Vehicles", Dec. 25, 2015, obtained online from < https://arxiv.org/pdf/1512.08048.pdf>, retrieved on Nov. 13, 2018.*
(Continued)

*Primary Examiner* — Farid Homayounmehr
*Assistant Examiner* — Zhimei Zhu
(74) *Attorney, Agent, or Firm* — Procopio, Cory, Hargreaves & Savitch LLP

(57) ABSTRACT

Example implementations of the present disclosure are directed to systems and methods directed to increasing the accuracy and speed that anomalous and malicious network data can be identified within a vehicle. Through the utilization of example implementations described herein, the security of the vehicle can be increased and the risk of a vehicle's internal systems being compromised and property being damaged can be reduced.

20 Claims, 18 Drawing Sheets

(51) Int. Cl.
*G06N 20/00* (2019.01)
*G08G 1/01* (2006.01)
*H04W 12/12* (2009.01)
*B60R 25/30* (2013.01)
*H04L 12/40* (2006.01)
*G07C 5/00* (2006.01)
*G07C 5/02* (2006.01)
*G07C 5/08* (2006.01)
*H04W 4/40* (2018.01)

(56) References Cited

U.S. PATENT DOCUMENTS

| | | | |
|---|---|---|---|
| 2004/0172557 A1* | 9/2004 | Nakae | H04L 63/0227 726/22 |
| 2008/0255721 A1* | 10/2008 | Yamada | G07C 5/008 701/31.4 |
| 2012/0041575 A1* | 2/2012 | Maeda | G05B 23/024 700/80 |
| 2013/0024060 A1* | 1/2013 | Sukkarie | G01C 21/26 701/22 |
| 2013/0152200 A1* | 6/2013 | Alme | H04L 63/145 726/24 |
| 2015/0191135 A1* | 7/2015 | Ben Noon | B60R 16/023 726/22 |
| 2016/0323287 A1 | 11/2016 | Kishikawa et al. | |
| 2016/0359893 A1 | 12/2016 | Kishikawa et al. | |
| 2016/0381068 A1* | 12/2016 | Galula | H04L 63/123 726/23 |
| 2017/0013005 A1* | 1/2017 | Galula | H04L 63/1425 |
| 2017/0092021 A1* | 3/2017 | Nielsen | G05B 23/024 |
| 2017/0126703 A1 | 5/2017 | Ujiie et al. | |
| 2017/0147812 A1* | 5/2017 | Ujiie | B60R 16/0231 |
| 2017/0372431 A1* | 12/2017 | Perl | G06Q 20/10 |
| 2018/0159870 A1 | 6/2018 | Tanabe et al. | |
| 2018/0170326 A1* | 6/2018 | Wang | B60T 7/085 |
| 2018/0183827 A1* | 6/2018 | Zorlular | H04L 63/1416 |
| 2018/0295147 A1* | 10/2018 | Haga | H04L 63/1425 |

FOREIGN PATENT DOCUMENTS

| | | |
|---|---|---|
| JP | 2016-134913 A | 7/2016 |
| JP | 2017-047835 A | 3/2017 |
| WO | 2017/006537 A1 | 1/2017 |
| WO | 2017/038351 A1 | 3/2017 |
| WO | 2016/088304 A1 | 4/2017 |
| WO | 2016/038816 A1 | 6/2017 |

OTHER PUBLICATIONS

Bißmeyer, Norbert : Misbehavior Detection and Attacker Identification in Vehicular Ad-hoc Networks, 2014, Technische Universität, Darmstadt [Ph.D. Thesis].*

Extended European Search Report for related EP Application No. 18159419.3, dated Jul. 16, 2018; 10 pages.

Office Action for related Japanese Patent Application No. 2018-031384, dated Dec. 27, 2018; English translation provided; 9 pages.

* cited by examiner

| Model Name | Model Group | Model Variant Group | Data Type | Triggers for usage |
|---|---|---|---|---|
| CAN High Speed Model | High Speed Model Group | None | CAN | State of car is high speed (>55 mph) |
| CAN High Speed ADAS Model | High Speed Model Group | ADAS | CAN | State of car is that ADAS is enabled at high speed |
| CAN Medium Speed Model | Medium Speed Model Group | None | CAN | State of car is medium speed (>25 mph) |
| CAN Medium Speed ADAS Model | Medium Speed Model Group | ADAS | CAN | State of car is that ADAS is enabled at medium speed |
| CAN Low Speed Model | Low Speed Model Group | None | CAN | State of car is low speed (<25 mph) |
| CAN Low Speed ADAS Model | Low Speed Model Group | ADAS | CAN | State of car is that ADAS is enabled at low speed |
| CAN Neutral Model | Neutral Model Group | None | CAN | State of car is neutral and not moving |
| CAN Neutral ADAS Model | Neutral Model Group | ADAS | CAN | State of car is that ADAS is enabled at neutral and standstill |
| ... | ... | ... | ... | ... |

FIG. 7

| Data ID | Creation Timestamp | Network transaction timestamp | Data Type | Data Source | Data Destination | Value Type | Payload Value |
|---|---|---|---|---|---|---|---|
| 7 | 148175 | 148225 | 31 | 1000 | 1110111 | 46 | 4568.32 |
| 8 | 148179 | 148228 | 31 | 1011 | 1100011 | 52 | 32.05 |
| ... | ... | ... | ... | ... | ... | ... | ... |

FIG. 10

COOPERATIVE CLOUD-EDGE VEHICLE ANOMALY DETECTION

BACKGROUND

Field

The present application is generally directed to vehicle systems, and more specifically, to cloud-edge vehicle anomaly detection.

Related Art

In related art implementations, vehicle systems are becoming increasingly complex and connected to the outside world, which has led to an increase in attack surfaces and vulnerabilities in the internal networks and systems of vehicles.

In related art implementations, anomaly detection of a network may only take into account the transmitted data. FIG. 1 illustrates a diagram of an existing network anomaly detection system. In such a related art network anomaly detection system 100, network data 101 is received by the anomaly detection system 100, which is fed into a classical anomaly analysis method 102. The results of the classical anomaly analysis method 102 are then used to generate alerts and detect anomalies in the received data at 103.

SUMMARY

Aspects of the present disclosure can include a non-transitory computer readable medium, storing instructions to execute a process. Such instructions can include managing model management information associating each of a plurality of analytic models with one or more types of data associated with a vehicle, and an operation status of the vehicle; for received data associated with the vehicle and non-receipt of a report from another vehicle or a cloud, determining a type of the received data from the vehicle and the operation status of the vehicle; selecting one or more analytic models of the plurality of analytic models based on the determined type of the received data associated with the vehicle, the determined operation status of the vehicle, and the model management information; and executing the selected one or more analytic models on the received data to generate an anomaly determination of the received data.

Aspects of the present disclosure can include a method, which can include managing model management information associating each of a plurality of analytic models with one or more types of data associated with a vehicle, and an operation status of the vehicle; for received data associated with the vehicle and non-receipt of a report from another vehicle or a cloud, determining a type of the received data from the vehicle and the operation status of the vehicle; selecting one or more analytic models of the plurality of analytic models based on the determined type of the received data associated with the vehicle, the determined operation status of the vehicle, and the model management information; and executing the selected one or more analytic models on the received data to generate an anomaly determination of the received data.

Aspects of the present disclosure can include a system, which can involve a vehicle platform having a memory configured to manage model management information associating each of a plurality of analytic models with one or more types of data associated with a vehicle, and an operation status of the vehicle; and a processor, configured to, for received data associated with the vehicle and non-receipt of a report from another vehicle or a cloud, determine a type of the received data from the vehicle and the operation status of the vehicle; select one or more analytic models of the plurality of analytic models based on the determined type of the received data associated with the vehicle, the determined operation status of the vehicle, and the model management information; and execute the selected one or more analytic models on the received data to generate an anomaly determination of the received data.

Aspects of the present disclosure can include a system, which can include means for managing model management information associating each of a plurality of analytic models with one or more types of data associated with a vehicle, and an operation status of the vehicle; for received data associated with the vehicle and non-receipt of a report from another vehicle or a cloud, means for determining a type of the received data from the vehicle and the operation status of the vehicle; means for selecting one or more analytic models of the plurality of analytic models based on the determined type of the received data associated with the vehicle, the determined operation status of the vehicle, and the model management information; and means for executing the selected one or more analytic models on the received data to generate an anomaly determination of the received data.

BRIEF DESCRIPTION OF DRAWINGS

FIG. 7 illustrates an example list of model groups used for analysis, in accordance with an example implementation.

FIG. 10 illustrates an example of the database entries of the data module database, in accordance with an example implementation.

DETAILED DESCRIPTION

Figure 1:
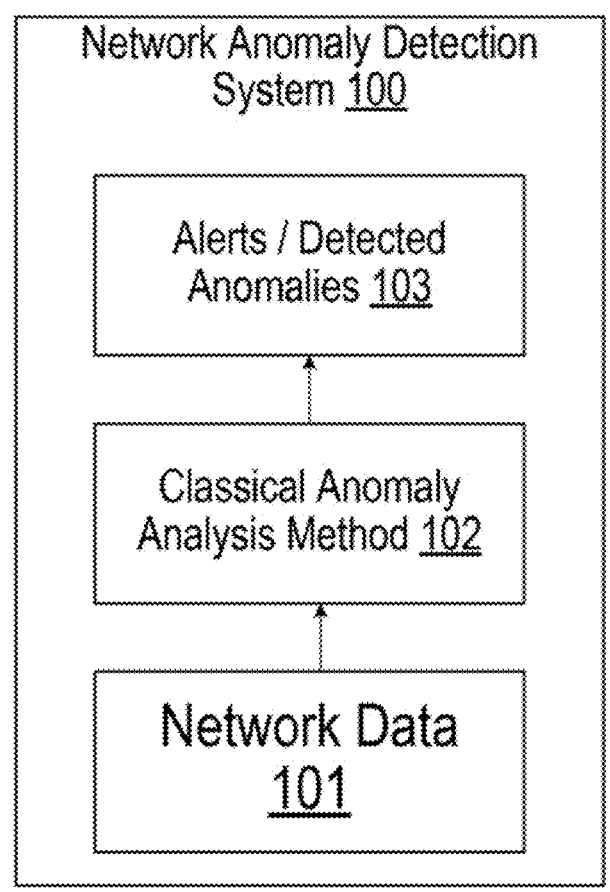
FIG. 1 illustrates a diagram of an existing network anomaly detection system.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations are directed to improvements on existing anomaly detection systems for data provided to vehicles such as cars, as related art systems may be limited in only considering incoming data to the vehicle. Example implementations are thus directed to an anomaly detection system that is extended to data from multiple sources, such as the car area network (CAN), vehicle Local Area Network (LAN), location data, and so on. Through the use of multiple sources, example implementations utilize an analysis function that takes into consideration different models to use based on the received data, which can thereby improve the anomaly detection rate and the accuracy rate.

Example implementations involve an anomaly detection system configured to facilitate communications with other car platforms to share detection data and also facilitate communications with a security operation center (e.g. remote) to get updated detection data and verify results.

Figure 2:
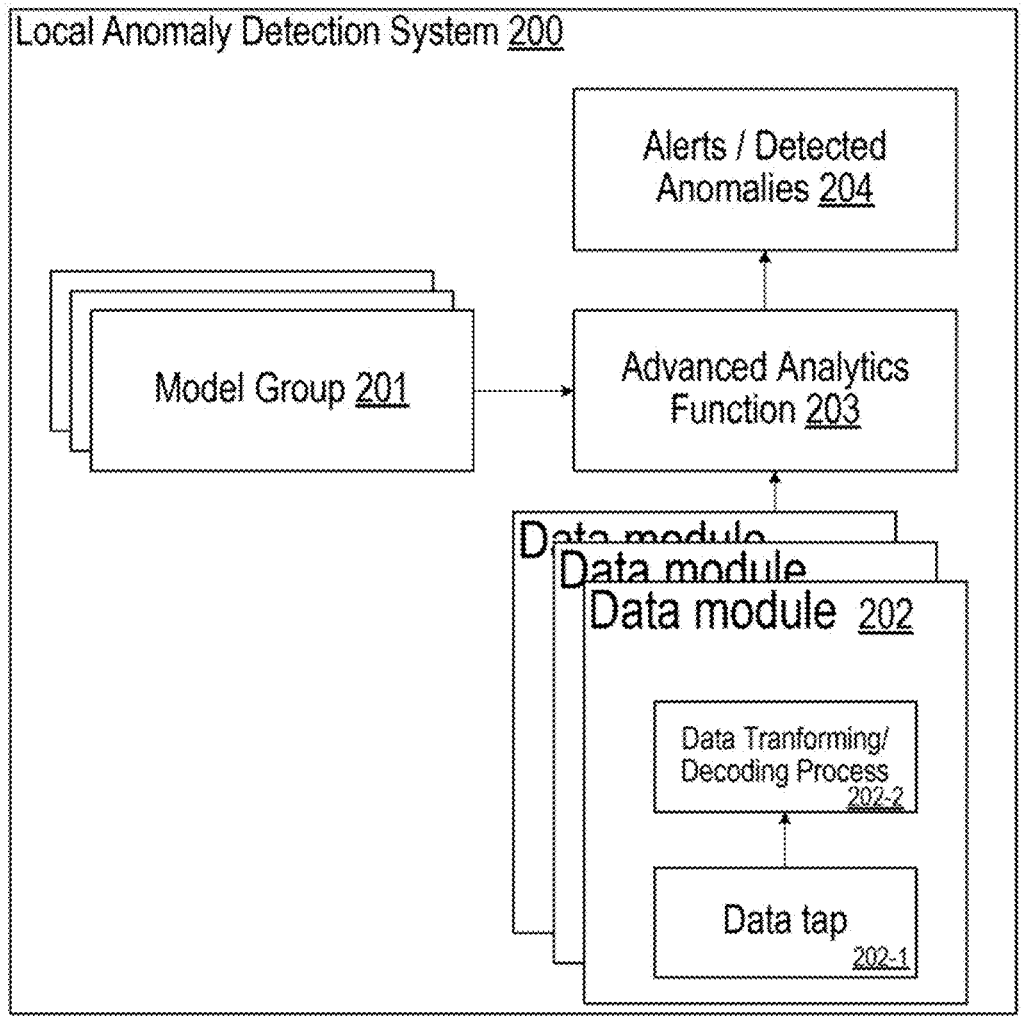
FIG. 2 illustrates a diagram of an anomaly detection system, in accordance with an example implementation.

FIG. 2 illustrates a diagram of an anomaly detection system, in accordance with an example implementation. In vehicle platforms, there can be many different data sources and networks in the vehicle, and different operation conditions for the vehicle (e.g. parking, driving). By using state-specific models from a group and by factoring in data from multiple sources, the anomaly detection system can improve in accuracy as illustrated in FIG. 2.

In the example of FIG. 2, there is a local anomaly detection system 200 which can be provided to a vehicle. The local anomaly detection system 200 can involve a model group 201 from which the state-specific models are selected and fed into an advanced analytics function 203 to generate alerts or detect anomalies in the incoming data at 204. Advanced analytics function 203 is configured to receive data from data module 202 and generate alerts or detect anomalies 204 based on the supplied models from model group 201. Data module 202 can encompass various sources of data, which is fed through a data tap 202-1 and then transformed through a data transforming/decoding process 202-2 to provide data in the format for processing by advanced analytics function 203.

Figure 3:
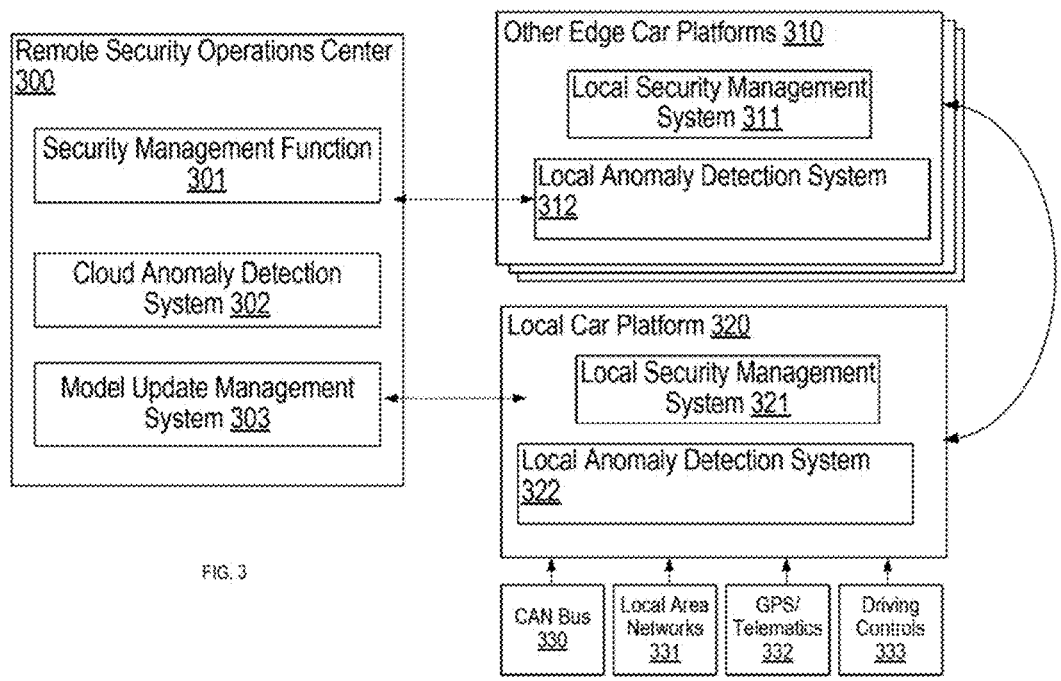
FIG. 3 illustrates a diagram of an anomaly detection system of vehicle and cloud communications, in accordance with an example implementation.

FIG. 3 illustrates a diagram of an anomaly detection system of vehicle (e.g., V2X) and cloud communications, in accordance with an example implementation. The accuracy and speed of anomaly detection and the utility of the system can be further improved by distribution of processed results of the local vehicle anomaly detection system 200 with those of other vehicles over vehicle communication and with a cloud security operation center, as illustrated in FIG. 3. Example implementations facilitate a vehicle to receive anomaly reports from the anomaly detection systems of other vehicles and a core security center in order to assist with the evaluation of its own data messages.

On each local car platform 320, the vehicle has several inputs from different data sources, such as CAN messages from the CAN Bus 330 from Electronic Control Units (ECUs), Internet Protocol (IP) data on Local Area Networks (LAN) 331 such as vehicle LAN from telematics devices or Internet connected services or, Global Positioning Satellite (GPS) positional data or telematics 332 from a General Packet Radio Service (GPRS) sensor, or the state of driving controls 333 from the driving control instruments. The car also has a local security management system 321 configured to react to the report results and alerts produced by the local anomaly detection system 322 by enabling safety modes in the Electronic Control Units, Telematics-connected devices or other car functions.

Local Car Platform 320 is configured to be communicatively coupled to other edge car platforms 310 through any communication methods according the desired implementation. Each edge car platform 310 is configured similarly to the local car platform 320 and can have a corresponding local security management system 311 and local anomaly detection system 312.

Remote security operations center 300 is configured to manage both the local car platform 320 and one or more edge car platforms 310. Remote security operations center 300 can include security management function 301, cloud anomaly detection system 302 and model update management system 303. Security management function 301 is configured to issue emergency alerts based on received data, as described with respect to FIG. 12 and FIG. 14. Cloud anomaly detection system 302 is configured to evaluate if data is anomalous or not, as illustrated with respect to FIG. 12. Model update management system 303 is configured to provide updates to the models used by the local car platform 320 and edge car platforms 310 as described in FIG. 4.

Figure 4:
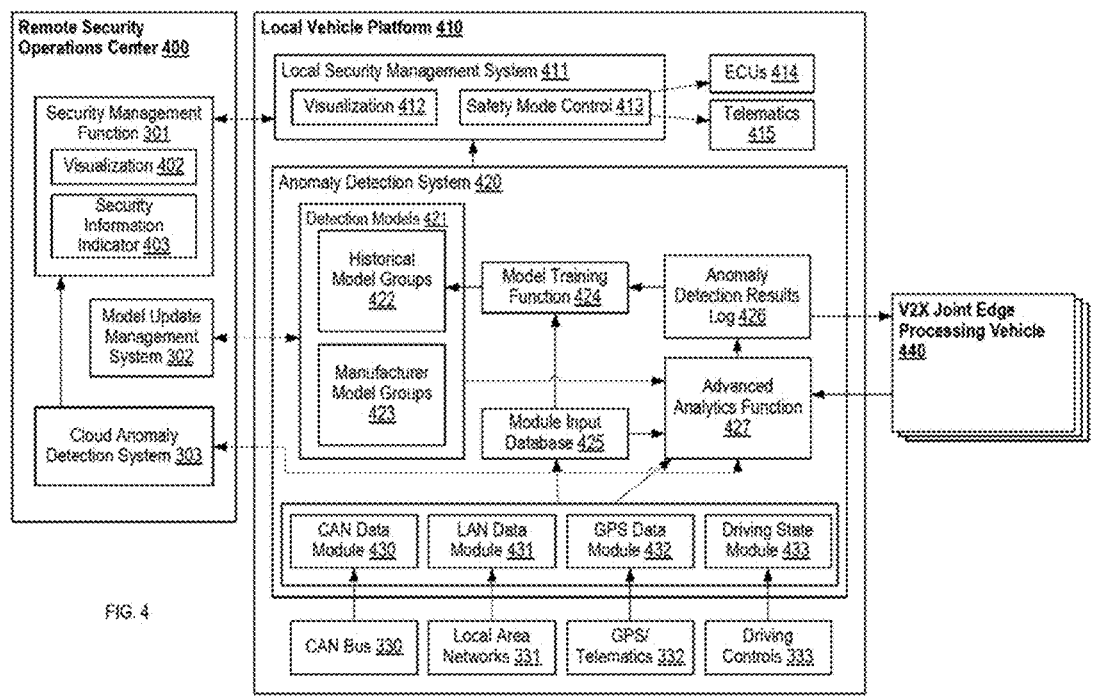
FIG. 4 illustrates an expansion of the architecture of a local vehicle platform, in accordance with an example implementation.

FIG. 4 illustrates an expanded architecture of the local vehicle platform 410, in accordance with an example implementation. In the architecture of FIG. 4, data modules are utilized for receiving data, processing the received data into desired formats, and providing the data for the anomaly detection system. Data is provided both into a database for storage and also into the anomaly detection system, which analyzes each of the messages based on selected models from corresponding model groups. The results of the anomaly detection system are stored in a detection results log and provided to a management system that acts on the results.

Possible data sources of the vehicle include the CAN Bus 330, LAN 331, GPS and Telematics 332, and Driving controls 333 but could also include any other data sources depending on the desired implementation. These data sources are read by data modules, such as CAN data module 430, LAN data module 431, GPS data module 432, and driving state module 433, corresponding to the type of the data received for the anomaly detection system 420. These data modules output the processed messages from the data sources to a module input database 425, which stores the data for future usage, and the advanced analytics function 427.

The CAN bus 330 is the car area network on which some or all of the ECUs 414 utilize for communication. Depending on the desired implementation there can be multiple CAN networks associated with their own set of ECUs 414, and there can also be ECUs 414 that are not connected to the CAN bus 330. LAN 331 can be utilized to facilitate communications between systems such as the radio screen, software updates, controllers, and so on, and can be implemented as vehicle LAN. GPS and telematics 332 facilitate data intake from devices of the vehicle. Driving controls 333 can provide information regarding whether the vehicle is in park or neutral, or has driving assistance such as ADAS enabled or disabled, and so on.

The advanced analytics function 427 is configured to determine if the data messages are anomalous, malicious or safe, and to output the results to the local security management system and the anomaly detection results log 426 for future storage. The advanced analytics function 427 is further configured to cooperate with the anomaly detection systems of other platforms 440, using the anomaly results received in order to analyze data messages, and can output anomaly results to other platforms 440 in accordance with the desired implementation.

When analyzing data, the advanced analytics function 427 is configured to use a selection of detection models 421 from different model groups. These model groups can include a manufacturer provided model group 423 and a historical model group 422. The historical model group 422 contains anomaly models that are generated based on machine learning algorithms or other methods as exercised on historical data and data stored on the module input database 425, and can be updated by a model training function 424. The model training function 424 uses the historical messages stored at the module input database 425. The manufacturer provided model group 423 involves models that are provided by the manufacturer of the vehicle to detect anomalies. Examples of such models are provided with respect to FIG. 6 and FIG. 7.

Local security management system 411 is configured to act on reports provided by the anomaly detection system 420. Such actions can include as providing the visualizations to the user, activation of safety modes and so forth.

Local security management system 411 can be configured with visualization 412 which can interact with an interface to provide visualizations of anomaly detections to the operator of the local vehicle platform 410. Safety Mode Control 413 can invoke the safety mode of the vehicle through communication with the ECUs 414 and through the telematics 415. ECUs 414 are configured to process data internally in the vehicle, such as reading brake sensors, tire pressure, and so on depending on the desired implementations. Each of the ECUs 414 can be interdependent to receive the sensor information and execute functions based on the received sensor information, and communicate through the vehicle through the CAN bus 330. Each of the ECUs 414 analyzes received data to determine whether to read the message based on the data source. Telematics 415 can include devices configured to receive wireless or other communication to remote units such as GPS, remote help services, other vehicles or edge platforms, and so on. Should local security management system 411 determine that the received data is anomalous or malicious, the safety mode control 413 can thereby control the ECUs or telematics 415 based on the desired implementation for safety mode, which can include filtering data being received by ECUs 414, instruction to the ECUs 414 as to what data to utilize, instruction to the telematics 415 as to what data to utilize or what data to discard, and so on. Further details of the local security management system 411 are provided with respect to FIG. 11.

Figure 12:
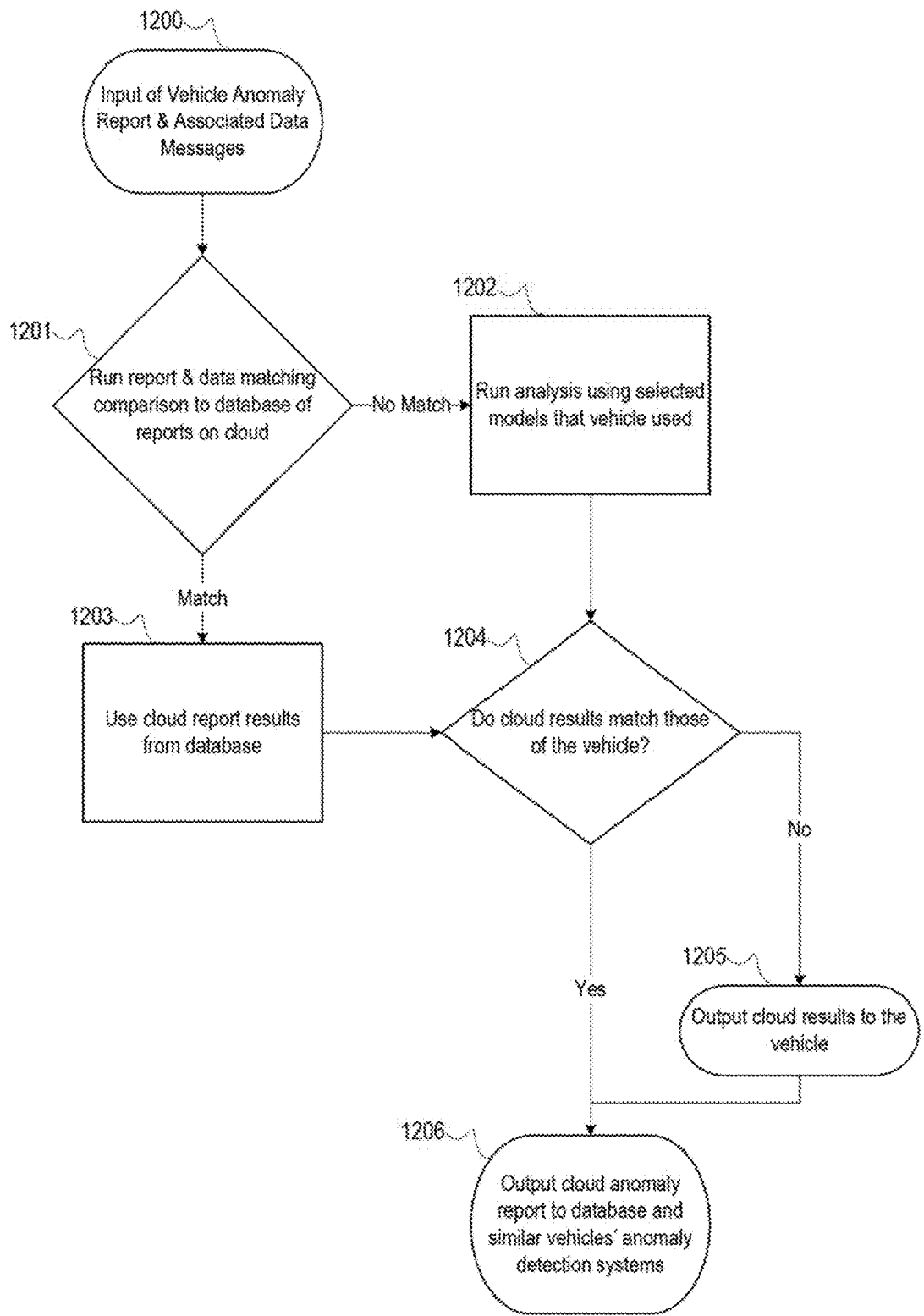
FIG. 12 illustrates the process flow of the local security management process for the remote security operations center, in accordance with an example implementation.

The remote security operations center 400 acts as the core platform for many edge vehicle platforms. As illustrated in FIG. 4, the remote security operations center 400 includes a cloud anomaly detection system 303 to evaluate edge vehicle data, a cloud model update management system 302 to update historical learning model groups and other model groups and distribute them to the edge, and a cloud security management function 301 to directly evaluate the overall security status and control the edge platforms. The security management function 301 can include visualization 402 and security information indicator 403. Visualization 402 can be configured to provide visual analytics and indicate to the operator of the remote security operation center 400 anomalies that have occurred in the managed local vehicle platform 410 and edge processing vehicles 440. Further details of the security management function 301 are provided with respect to FIG. 14. The remote security operations center 400 can utilize the cloud anomaly detection system 303 and the cloud security management function 301 to facilitate the functionality of the flow as illustrated in FIG. 12.

Figure 5:
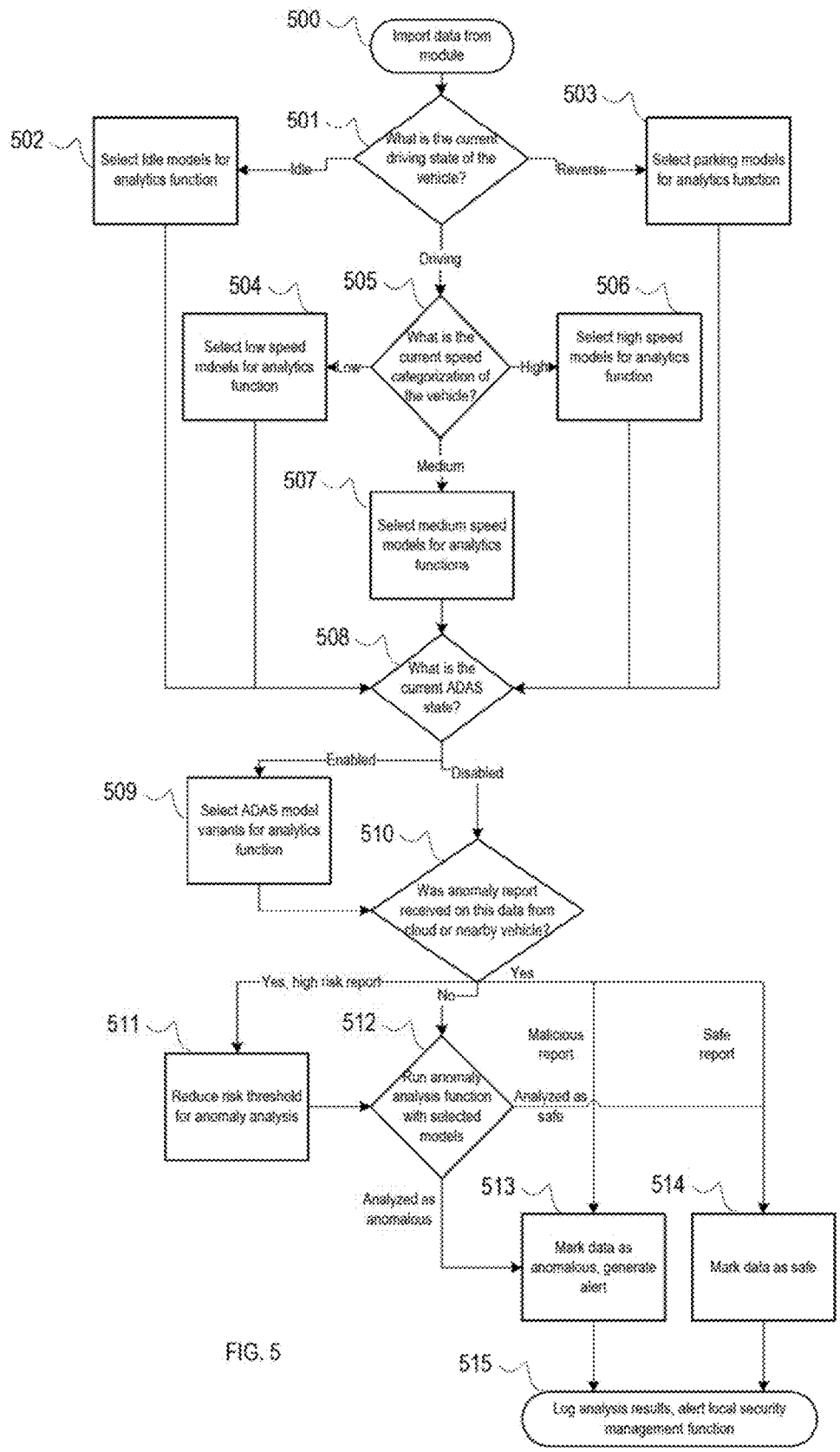
FIG. 5 illustrates an example process flow chart for the anomaly detection system to evaluate a given data message, in accordance with an example implementation.

FIG. 5 illustrates an example process flow chart for the anomaly detection system to evaluate a given data message, in accordance with an example implementation. The system evaluates the current states of the vehicle based on the data it receives and uses that to determine what detection models to use. The detection models are selected based on matching the type of the received data (e.g., CAN, LAN, GPS, driving), values of the received data (e.g. the speed value versus the range of speed values applicable to a model, the temperature value versus the range of temperature values applicable to a model), the model variant group of the received data (e.g. ADAS or none), and so on with the management information for the model group categorizations as described in FIGS. 6 and 7 to determine the appropriate model to apply. Data is processed in accordance with the corresponding module as illustrated in FIGS. 8(*a*), 8(*b*) and 9.

At 500, data is imported from one or more data modules from FIG. 4 (e.g., the CAN data module 430, the LAN data module 431, the GPS data module 432, and the driving module 433), whereupon the current driving state of the vehicle is determined at 501. In example implementations, the advanced analytics function 427 determines the driving state of the vehicle based on the received data (e.g. whether the vehicle is moving or not based on the CAN data and the GPS data, the gear status of the vehicle based on the CAN data, and so on, depending on the desired implementation). If the driving status is considered to be idle (Idle), then the flow proceeds to 502 wherein the advanced analytics function 427 extracts the models related to the vehicle in idle mode from the detection models 421. If the driving status is considered to be reverse (Reverse), then the flow proceeds to 503 wherein the advanced analytics function 427 extracts the models related to the vehicle in parking or reverse mode from the detection models 421. Otherwise, if the driving status is considered to be driving (Driving), the flow proceeds to 505 wherein the advanced analytics function 427 determines the categorization of the speed of the vehicle, (e.g. as low, medium or high depending on the desired threshold speed ranges for implementation).

For example, if the speed categorization is low (Low), then the flow proceeds to 504 wherein the advanced analytics function 427 extracts the models related to the vehicle in parking or reverse mode from the detection models 421. If the speed categorization is high (High), then the flow proceeds to 506 wherein the advanced analytics function 427 extracts the models related to the vehicle in high speed from the detection models 421. Otherwise, if the speed categorization is medium (Medium), then the flow proceeds to 507 wherein the advanced analytics function 427 extracts the models related to the vehicle in medium speed from the detection models 421.

At 508, the advanced analytics function 427 determines the advanced driver assistance system (ADAS) state of the vehicle from the received data (e.g. from the CAN data). If the ADAS system is enabled (Enabled), then the flow proceeds to 509 to select the ADAS version of the selected models from the detection models 421. Otherwise (Disabled), the flow skips the flow at 509 and proceeds to 510.

At 510, a determination is made by the advanced analytics function 427 as to whether an anomaly report was received regarding the processed data by either the cloud (e.g. remote security operations center 400), or other edge processing vehicles 440. If so, and the report is a high risk report (Yes, high risk report), then the flow proceeds to 511 to reduce the risk threshold for the anomaly analysis. Otherwise (Yes), for the received report indicative of the data being malicious (Malicious Report), then the flow proceeds to 513 to mark the data as anomalous. If the report indicates the data is safe (Safe Report), then the flow proceeds to 514 to mark the data as safe. Further details about such reports are provided with respect to FIG. 12.

At 512, the advanced analytics function 427 utilizes the extracted models on the received data to determine if the data is anomalous. If the data is analyzed as anomalous (Analyzed as anomalous) then the flow proceeds to 513 to mark the data as anomalous and generate an alert for transmission to the local security management system 411. Otherwise, if the data is analyzed as safe (Analyzed as safe) then the flow proceeds to 514 to mark the data as safe. At 515, the advanced analytics function 427 logs the analysis results with anomaly detection logs results 426, and submits an alert to the local security management system 411 based on the results.

In example implementations, the difference between model groups can involve the data ranges and patterns that are considered to be acceptable for reporting as safe. If the data falls outside of the ranges that the model has set to be acceptable, the data can thereby be marked as anomalous or malicious. For example, data from a sensor reporting forward acceleration can be marked as anomalous in an idle model while being marked as safe in driving state models. Data from an ECU reporting engine revolutions per minute (RPM) values over a certain amount continuously can be marked as anomalous in a low speed model while being marked as safe in medium and high speed models. GPS data that showed the vehicle moving only ten feet since the last GPS data from one second ago can be marked as anomalous in medium speed, high speed, or idle models while being marked as safe in low speed models. Data from the driving controls reporting a cruise control value set to 70 miles per hour (mph) can trigger an anomalous or malicious alert in idle, low and medium speed models while being marked as safe in high speed models. For ADAS state models, such models can determine data generated by ADAS-related ECUs and other sources as acceptable, while non-ADAS models would not accept the data as being safe. For example, ECU data containing commands sent to the steering control from a Lane Keep Assist System can be marked as safe by an ADAS model while being marked as anomalous or malicious by non-ADAS models. Accordingly, the model selected based on the input data and the state of the vehicle will determine the data range for non-anomalous data versus anomalous data.

Figure 6:
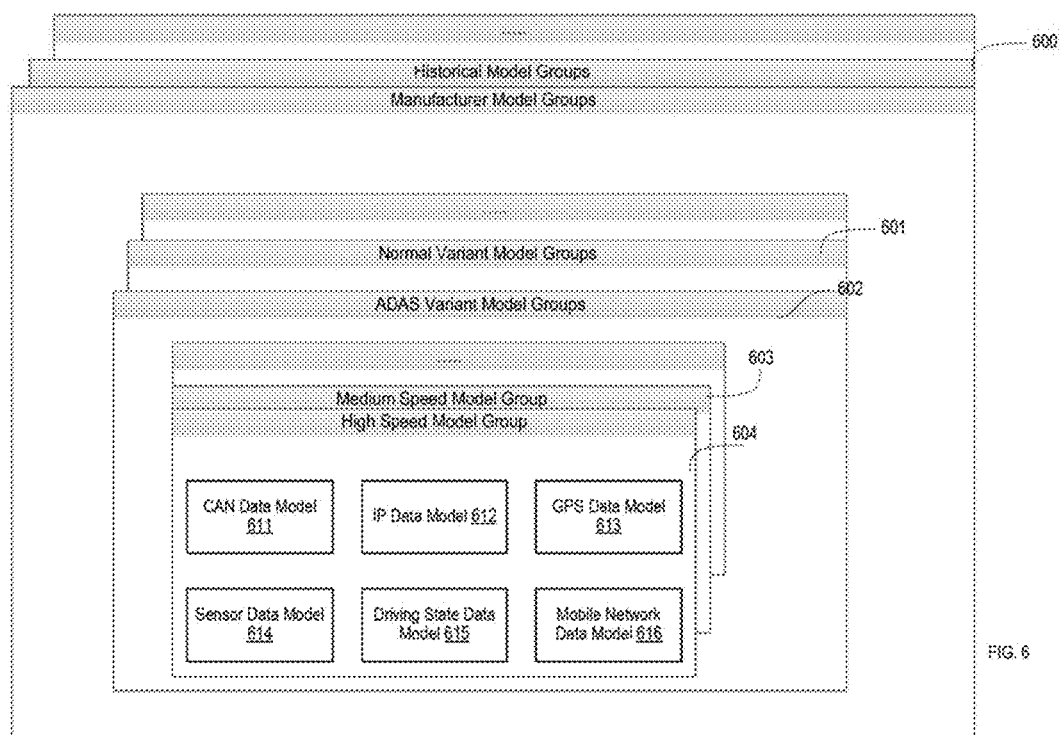
FIG. 6 illustrates a hierarchy of model groups used for analysis, in accordance with an example implementation.

FIG. 6 illustrates a hierarchy of model groups used for analysis, in accordance with an example implementation. As illustrated in FIG. 4 and described in FIG. 5, during the anomaly detection system process, the models to be used for analysis are selected from the model groups. Each model group contains specific models for assessing certain types of data. The model groups can be further grouped together based on their specific usage. FIG. 6 illustrates an example hierarchy of such model groups. At the top level 600, model groups are designated by how they were created, such as the historical model groups 422 that is based on past data or the manufacturer model groups 423 that are provided by the manufacturer. Inside each group, there can be variant model groups that pertain to a certain binary vehicle state, such as the normal variant model groups 601 that operate when ADAS is disabled, and ADAS variant model groups 602 that are designed for when assisted and automated driving is active.

Beyond that, the lowest level model groups are divided based on the driving state of the car, such as the vehicle operating within the speed range considered to be medium for the medium speed model group 603, and the speed range considered to be high for the high speed model group 604. Such models groups can also have specific models based on the type of the processed data, such as the CAN data model 611 for data processed from the CAN data module 430, the IP data model 612 for data processed from the LAN data module 431, the GPS data model 613 for data processed from GPS data module 432, the sensor data model 614 for data processed from sensors such as the CAN data module 430, and driving state module 433, the driving state data model 615 processed from driving state module 433, and the mobile network data model 616 from the LAN data module 431.

FIG. 7 illustrates an example list of model groups used for analysis, in accordance with an example implementation. Such information can be stored in memory as management information as an index for the available models, or through other methods according to the desired implementation. Such indexing information can include the model name 701 (e.g., CAN High Speed Model, CAN High Speed ADAS Model), the model group parent 702 (e.g. High Speed Model Group, Medium Speed Model Group), the model modifier group 703 (e.g., ADAS, none), the data type 704 (e.g., CAN, GPS, LAN), and triggers for usage 705 (e.g. state of car is in low speed (<25 mph), state of car is that ADAS is enabled at low speed). For example, the CAN High speed model is part of the high speed model group, and is triggered when the data type received is CAN, the state of the car is at high speed (>55 mph) and ADAS is not engaged as illustrated in FIG. 5. Other indexing information can be utilized in accordance with the desired implementation. As illustrated in FIG. 5, the model is selected based on matching the parameters of the received data (data type, model variant, triggers for usage, etc.) with the management information of models as illustrated in FIG. 6 and FIG. 7.

Figure 8A:
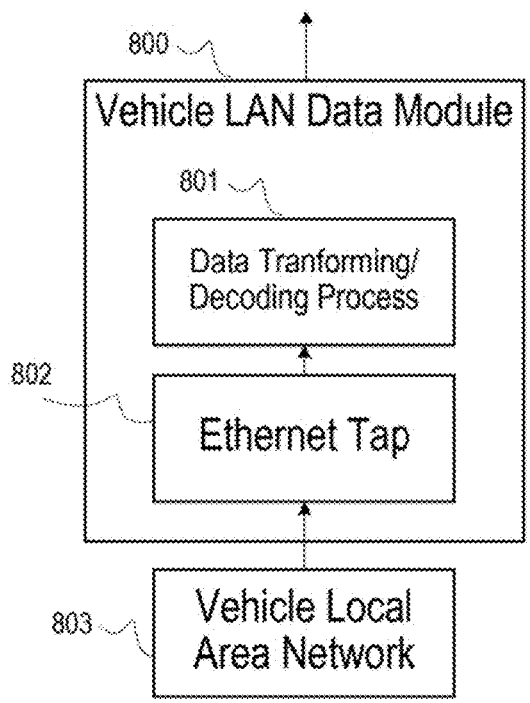
FIGS. 8(a) and 8(b) illustrate the process diagrams of two example data modules, one for vehicle Local Area Network (LAN) data and one for Car Area Network (CAN) data, in accordance with an example implementation.
Figure 8B:
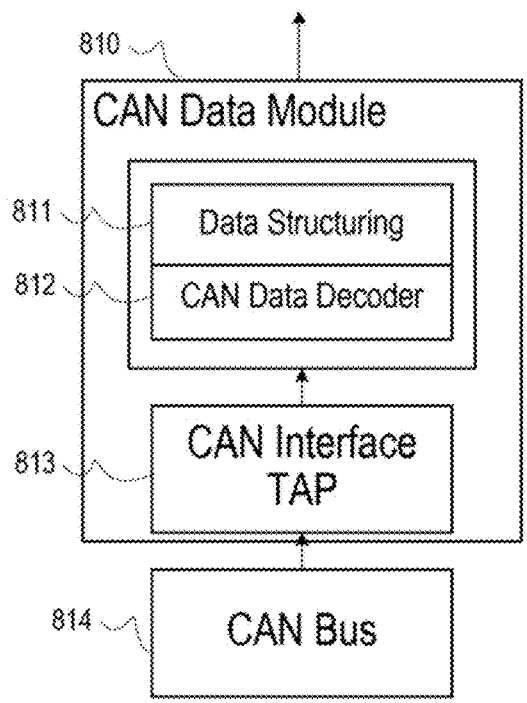

FIGS. 8(a) and 8(b) illustrate the process diagrams of two example data modules, one for vehicle LAN data and one for CAN data, in accordance with an example implementation. For each module, there is a tap that allows it to read data from the source. The data is then transformed and decoded into a format that is able to be used by the anomaly detection system. In the example of FIG. 8(a), the vehicle LAN data module 800 receives data from the vehicle LAN 803 and is configured with an Ethernet tap 802 configured to receive data from the vehicle LAN 803. The data is then transformed through a data transforming/decoding process 801 to restructure the data for processing by the module input database 425. In the example of FIG. 8(b), the CAN data module 810 receives data from the CAN bus 814, and is configured with a CAN interface tap 813 configured to receive data from the CAN bus 814. The data is then transformed through the use of a CAN data decoder 812 that is configured to decode and extract the relevant information in the CAN data, and data structuring 811 that is configured to restructure the data for processing by the module input database 425.

Figure 9:
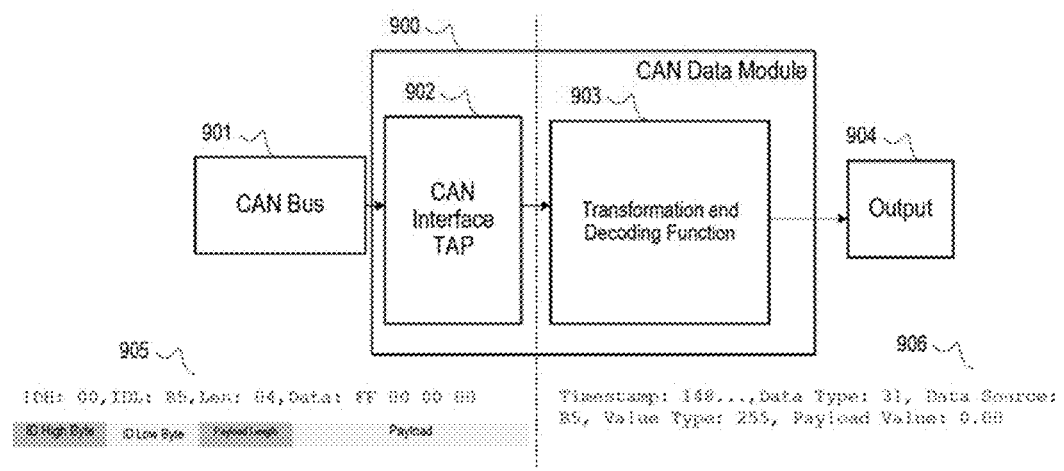
FIG. 9 illustrates an example of the CAN Data Module decoding and transforming a CAN packet into the system format, in accordance with an example implementation.

FIG. 9 illustrates an example of the CAN Data Module decoding and transforming a CAN packet into the system format, in accordance with an example implementation. As shown in the flow 900 of the CAN data module, at 901 the CAN Bus data is fed into the CAN interface tap at 902, processed by a transformation and decoding function at 903 and then output is provided to the module input database 425 at 904. An example format of the CAN bus data is illustrated at 905, which can include an identifier (ID) high byte, an ID low byte, a payload length and the data payload. After the transformation and decoding processed at the flow at 903, the CAN data may be transformed as illustrated at 906, which can include a timestamp, a data type, the data source identifier, the value type and the payload value. The data can be then entered into a module input database 425 as illustrated in FIG. 10.

As shown by the example architecture of FIG. 9, data is captured through the tap, whereupon the data is decoded and transformed into a common format for entry in the database. In the example of FIG. 9, the CAN format 905 has a high byte, a low byte, and a payload. The decoding function would thereby translate the high-byte and low-byte into a data source, and further translates the payload into a payload value and the type of payload as shown at 906.

FIG. 10 illustrates an example of the database entries of the data module database, in accordance with an example implementation. As illustrated in the example data format at 906 of FIG. 9, such data is entered into database entries as illustrated in FIG. 10. Such entries can include a unique data ID per message 1001 that marks each data entry individually, the timestamp of when the entry was created 1002, the network transaction timestamp 1003 that indicates when the network transaction occurred on the network application, the data type 1004 that indicates the type of data of the message, the source 1005 and destination 1006 of the message, the type of value it contains 1007, and the decoded or actual payload value 1008. Models are then applied to the data according to the flow of FIG. 5.

Figure 11:
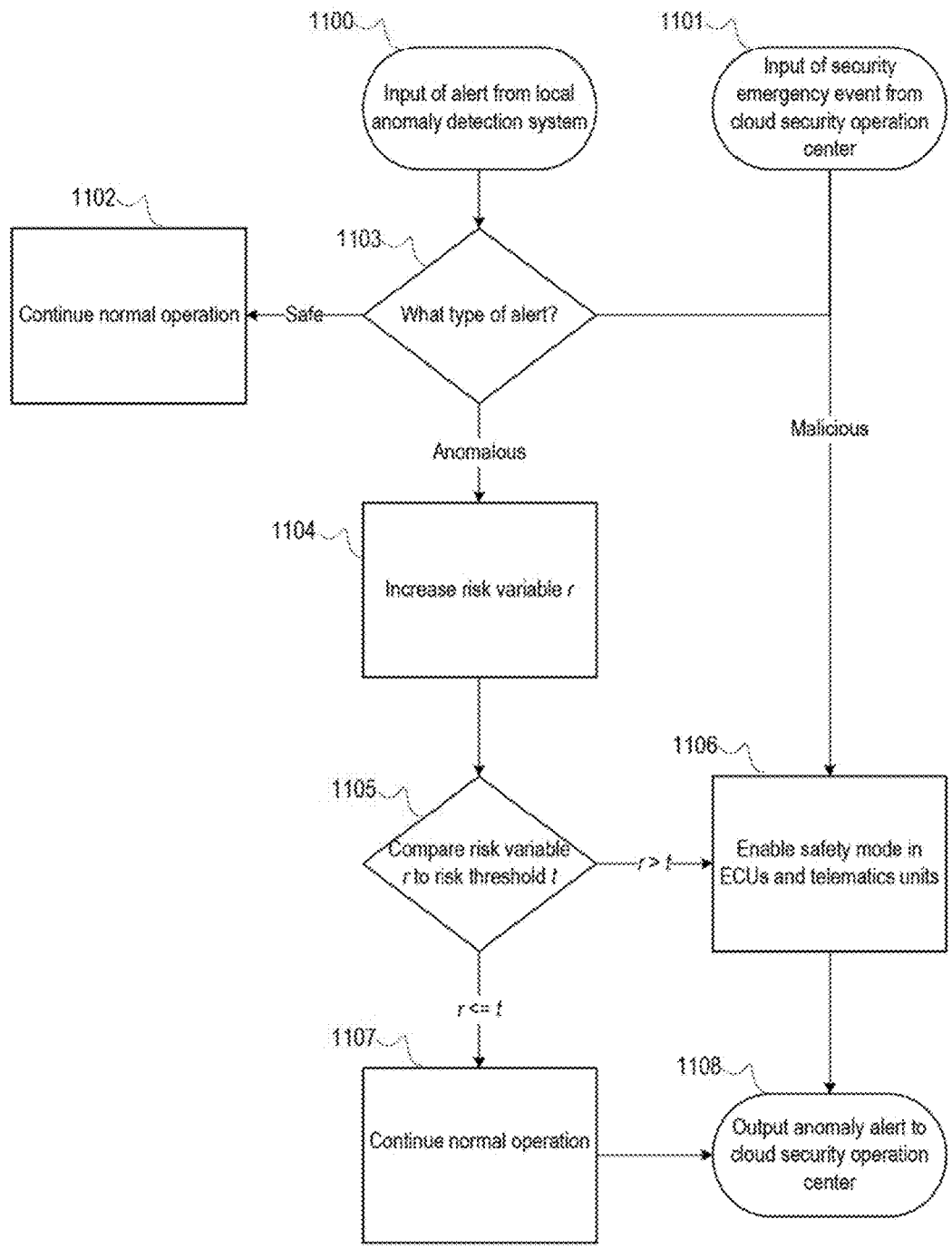
FIG. 11 illustrates an example process flow of the local security management system, in accordance with an example implementation.

FIG. 11 illustrates an example process flow of the local security management system 411, in accordance with an example implementation. In example implementations, the local security management system 411 is configured to process detected anomalies as being safe, anomalous or malicious. Through the example implementation of FIG. 11, the local security management system 411 can determine whether to continue normal operation, or enable safety mode based on either a determination that the data received is malicious, or based on a tracked risk variable in view of the number of suspicious or anomalous packets received. In such an implementation, if the number of suspicious or anomalous packets exceeds a certain threshold, then the safety mode can also be triggered.

At 1100, when the local security management system 411 receives anomalous or malicious alert from the local anomaly detection system 420, the local security management system 411 decides on what action to take at 1103 based on what type of alert is received. The security management system 411 can keep track of a risk level variable that is determined by how many anomalous reports it receives within a given window of time. If the data is determined to be safe, the flow proceeds to 1102 to continue the normal operation of the vehicle. Otherwise, if the data is determined to be anomalous (Anomalous), then the flow proceeds to 1104 to increase the risk variable r and then proceeds to 1105 to compare the risk variable r to the risk threshold t. If the risk variable r is larger than the risk threshold t (r>t) then the flow proceeds to 1106 to enable the safety mode functions on the vehicle platform. Safety mode functions can include instructing control units to ignore data from certain sources, or disabling network connections or automated driving features. If the risk variable r does not exceed the risk threshold t (r<=t), then the flow proceeds to 1107 to proceed with normal operations. At 1108, the local security management system 411 is configured to output an anomaly alert to the remote security operation center 400.

Additionally, as shown in the flow at 1101, local security management system 411 may receive a report of a security emergency event from remote security operations center 400, or depending on the desired implementation, other edge vehicles 440. In such circumstances, the report can directly instruct the local security management system 411 that the received data is malicious (Malicious), whereupon the local security management system 411 can enable safety mode at 1106. In this manner, reports regarding malicious data can be directly provided to the local vehicle platform 410 from remote security operations center 400.

FIG. 12 illustrates the process flow of the local security management process for the remote security operations center 400, in accordance with an example implementation. The remote security operations center 400 is configured to receive reports from the vehicle platforms and determine if such reports have already been processed before. If so, then the report is kept and output to the vehicle platforms. The remote security operations center 400 operates as a cloud as described in further detail at FIG. 13, and is continually updated. At 1200, the local security management system 411 intakes vehicle anomaly reports and associated data messages from edge anomaly detection systems. At 1201, the local security management system 411 runs report and data matching comparison to database of reports on cloud. If there is a match (Match), the flow proceeds to 1203 to use the cloud report results from the database. If there is no match (No Match), then the flow proceeds to 1202 to run an evaluation analysis on the associated data through the use of the same models to determine if the edge platform is correct.

At 1204, a determination is made as to whether the cloud results match those of the vehicle. If not (No), the flow proceeds to 1205 to output the results determined by the cloud to the vehicle edge platforms. Otherwise (Yes), the flow proceeds to 1206 to output the cloud anomaly report to the database and to the other anomaly detection systems of the vehicles edge platforms.

As illustrated in FIG. 5, example types of reports can include a high risk report, a malicious report, and a safe report, however other reports may also be utilized in accordance with the desired implementation. The types of reports can be determined based on decisions made by the operator of the remote security operations center 400, or can be conducted automatically depending on the desired implementation and the type of data received. In an example implementation involving safe reports, anomalous reports attributed to old models from vehicles that have not received model updates yet, through installation of new software that changes the parameters of the data, or through other methods can be tagged as safe reports and thereby the data can be marked as safe by the corresponding vehicle platforms.

In an example implementation involving high risk reports, received data that are attributable to severe component failure, defective components that need to be recalled, or a large receipt of component or sensor failure or number of anomalies beyond a threshold for a particular type of vehicle may require that the anomaly threshold to be reduced for all of the remaining vehicles having the same manufacturer. Thus, receipt of such anomalous data can trigger instructions to transmit a high risk report to reduce the threshold detection for managed vehicle platforms. Other implementations may also be utilized for the high risk report, and the present disclosure is not particularly limited thereto.

In an example implementation involving malicious reports, data recognized by the remote security operations center 400 as being hacked data may be marked as malicious. Such data can involve utilization of checksums or other methods to verify the integrity of the data, or through any other desired implementation. Thus, data suspected to be tampered or hacked can be marked as malicious, and such reports can be distributed to the managed vehicle platforms according to the desired implementation.

Through these example implementations, a remote security operations center 400 can thereby distribute the validated cloud results to edge platforms to assist them with their anomaly processing.

Figure 13:
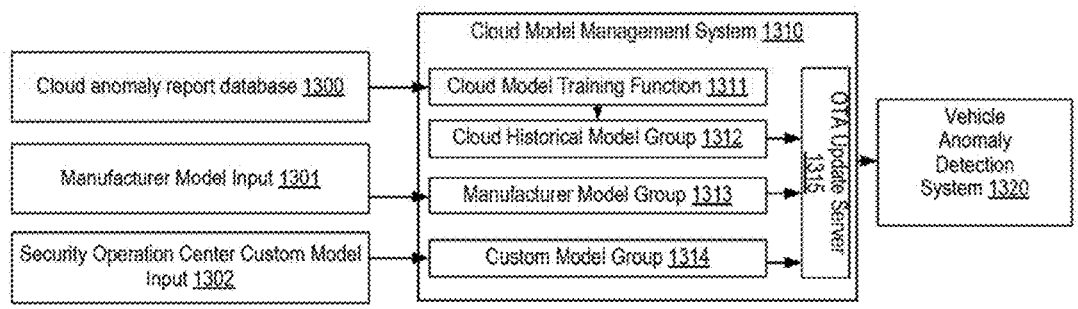
FIG. 13 illustrates an example diagram of the cloud model management system, in accordance with an example implementation.

FIG. 13 illustrates an example diagram of the cloud model management system, in accordance with an example implementation. Specifically, the cloud model management system 1310 illustrates the architecture for the remote security operations center 400 as implemented in a cloud architecture. In this example architecture, the cloud model management system 1310 is continually updated with model groups, which can be distributed to all of the vehicle platforms to update their corresponding anomaly detection systems and improve them as needed. The cloud model management system 1310 also is configured to receive reports continually, which can be utilized to conduct model training and update the historical model group.

In the example of FIG. 13, the cloud model management system 1310 manages cloud model training function 1311, cloud historical model group 1312, manufacturer model group 1313, custom model group 1314, and over the air (OTA) update server 1315. Cloud model training function 1311 is configured to train the models in the cloud historical model group 1312 through historical anomaly reports provided by the cloud anomaly report database 1300. Manufacturer model group 1313 stores the models created by the manufacturer for the vehicle platforms, and can be updated by the manufacturer through manufacturer model input 1301. Custom model group 1314 can store custom models in accordance with the desired implementation, and can be provided through the security operation center custom model input 1302.

Once the desired models are provided, the cloud historical model group 1312, manufacturer model group 1313 and custom model group 1314 can provide the models to the vehicle anomaly detection system 1320 through the over the air (OTA) update server 1315. Through the implementation as described in FIG. 13, the system can have updated models inputted from manufacturers, security operation center operators, or other authorized sources. The system can also take in historical anomaly report entries from a database in order to train and update historical models. These updated models can be pushed to edge vehicle anomaly detection systems via an OTA update service. Such implementations can improve related art implementations for vehicle platforms due to the lesser processing capabilities of a related art vehicle platform. Through the implementation of a cloud, because the processing you do in the car is limited, a security operation center implemented with the cloud architecture of FIG. 13 including as a neural network or machine learning infrastructure can result in better model training. Further, manufacturers that desire to manually input a new model in response to a manufacturing defect or security vulnerability can do so through the cloud architecture.

Figure 14:
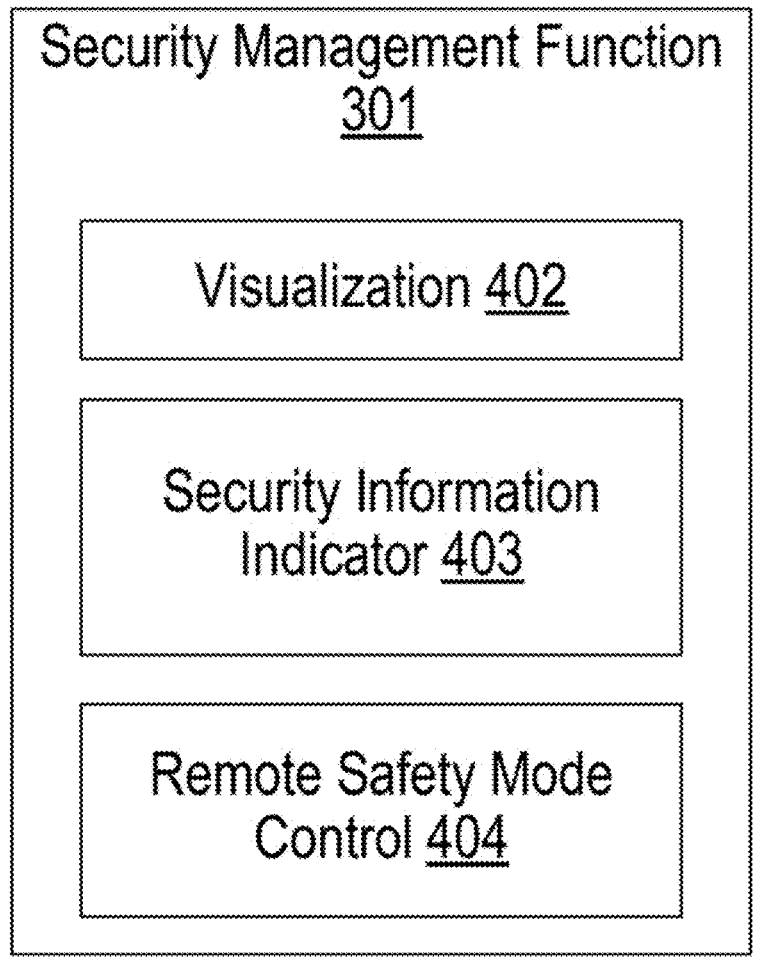
FIG. 14 illustrates a diagram of the cloud security management function 301, in accordance with an example implementation.

FIG. 14 illustrates a diagram of the cloud security management function 301, in accordance with an example implementation. The cloud security management function 301 receives anomaly report and security incidents from the edge security management systems and the cloud anomaly detection systems. Such inputs are used to evaluate, indicate and visualize the overall security of the complete vehicle network. Visualization 402 can provide visualizations regarding the detected anomalies and the overall security of the vehicle network in accordance with the desired implementation. Specifically, reports received by the cloud security management function can be gathered and digitized by visualization 402 to allow users of the remote security operations center 400 to determine how many malicious or anomalous reports are received across all of the overseen vehicle platforms, and to react accordingly.

Security information indicator 403 can be utilized to indicate the anomalous reports received from the managed vehicle platforms, in terms of the general health of the network or the risk to the network depending on the desired implementation. Depending on the desired implementation, a remote safety mode control 404 can also be provided to remotely control the safety mode functions of vehicles in the edge network by methods such as broadcasting an emergency security event as illustrated in FIG. 11.

Figure 15:
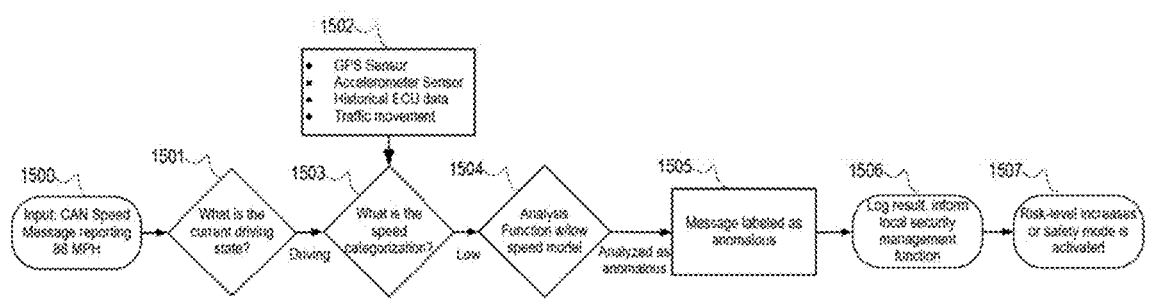
FIG. 15 illustrates an example process flow of the local anomaly detection system reacting to anomalous packets being injected into the CAN bus, in accordance with an example implementation.
Figure 16:
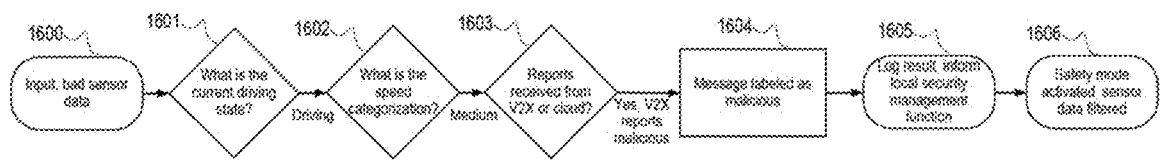
FIG. 16 illustrates another example flow, where a malicious device on a medium-speed expressway is interfering with sensor data on multiple vehicles, in accordance with an example implementation.
Figure 17:
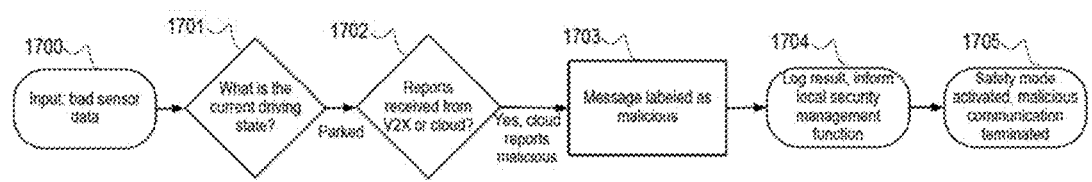
FIG. 17 illustrates another example process flow, where a malicious payload is being downloaded to a parked vehicle over a mobile network, in accordance with an example implementation.

FIGS. 15 to 17 illustrate example process flow executions of the local anomaly detection system in accordance with the flow diagram of FIG. 5. Specifically, FIG. 15 illustrates an example process flow of the local anomaly detection system reacting to anomalous packets being injected into the CAN bus, in accordance with an example implementation. In the scenario of FIG. 15, the vehicle has been driving at high speeds on a highway, but has suddenly slowed down due to traffic. However, CAN packets reporting a speed of 88 MPH are picked up by the CAN module at 1500. At 1501, the driving state is determined as that the vehicle is driving. At 1502, based on data received from the GPS sensor, the accelerometer sensor, the historical ECU data, and the traffic movement data, the speed categorization is determined to be low speed at 1503. Thus, the low speed model is selected in accordance with the matching of data parameters with the management information for the model groups as illustrated in FIG. 6 and FIG. 7, and the data is analyzed with the low speed model at 1504. In the example of FIG. 15, the local anomaly detection system is able to identify them as anomalous due to using the low speed analysis model on the received data, and indicates the received message as anomalous at 1505. At 1506, the results are logged and the local security management function is informed. At 1507, the risk-level is increased or the safety mode is activated based on the anomalous report.

FIG. 16 illustrates another example flow, where a malicious device on a medium-speed expressway is interfering with sensor data on multiple vehicles, in accordance with an example implementation. At 1600, suppose that bad sensor data is entered maliciously. At 1601, the driving state is determined as that the vehicle is driving. At 1602, based on data received from the GPS sensor, the accelerometer sensor, the historical ECU data, and the traffic movement data, the speed categorization is determined to be medium speed. At 1603, a determination is made as to whether reports are received from the V2X or cloud. In this example, it is determined that the V2X has provided reports indicating that the bad sensor data is malicious. Thus at 1604, the message is labeled as malicious. At 1605, the results are logged and the local security management function is informed. At 1606, the safety mode is activated based on the malicious report and thus the data is filtered from the bad sensor. Through this example implementation, anomaly detection systems of other vehicles within the V2X communication network have already analyzed this data as malicious. By using the shared anomaly reports on the sensor data, the local anomaly detection system is able to identify the data as anomalous and activate safety mode to filter the data from the sensor.

FIG. 17 illustrates another example process flow, where a malicious payload is being downloaded to a parked vehicle over a mobile network, in accordance with an example implementation. At 1700, suppose that bad sensor data is entered maliciously (e.g. malicious network data is transmitted to the network adapter of the car via mobile broadband or through a wireless connection). At 1701, the driving state is determined as that the vehicle is parked. At 1702, a determination is made as to whether reports are received from the V2X or cloud. In this example, it is determined that the cloud has provided reports indicating that the bad sensor data is malicious. Thus at 1703, the message is labeled as malicious. At 1704, the results are logged and the local security management function is informed. At 1705, the safety mode is activated based on the malicious report and thus the malicious communication can be isolated and terminated. In this example implementation, the network messages of this payload have already been identified as anomalous by the cloud anomaly detection system. By using the shared anomaly reports from the cloud, the local anomaly detection system is able to identify the network download as malicious and terminate the download.

Figure 18:
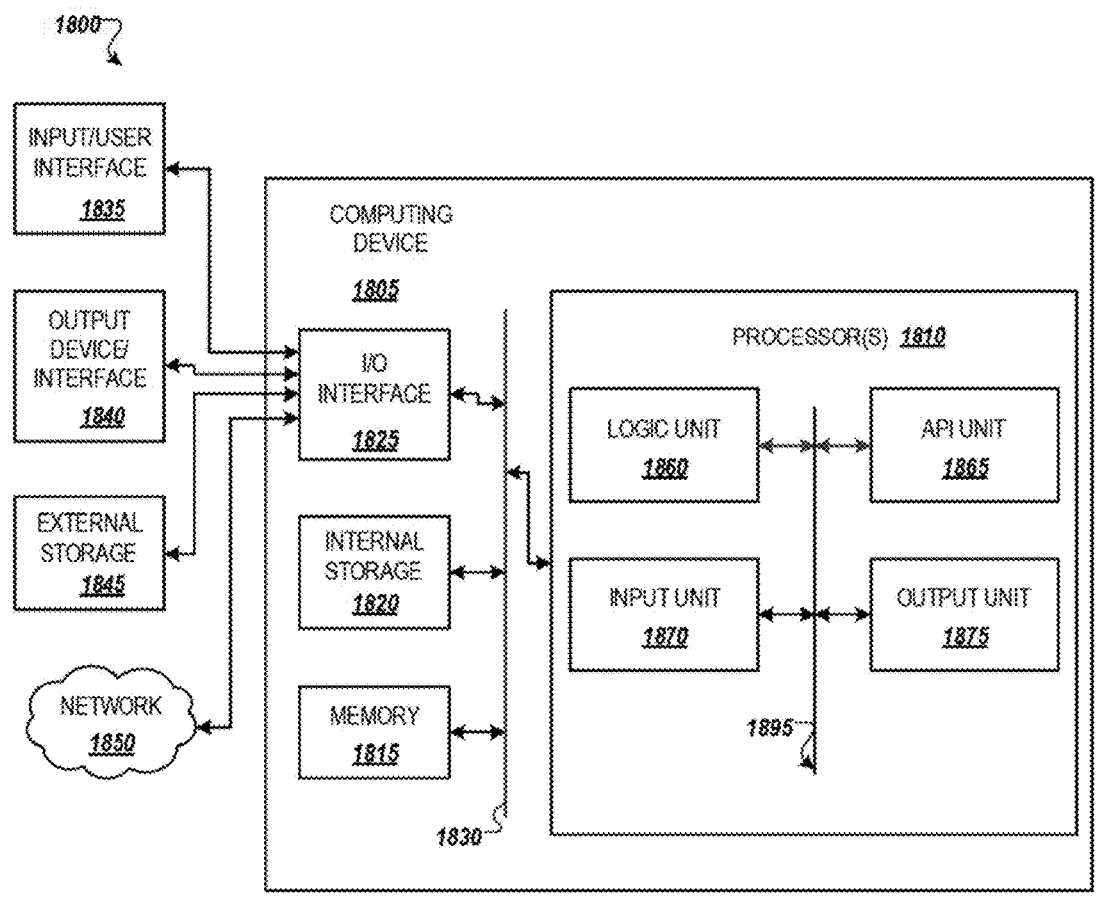
FIG. 18 illustrates an example computing environment with an example computer device suitable for use in some example implementations.

FIG. 18 illustrates an example computing environment with an example computer device suitable for use in some example implementations. The computer device 1805 of FIG. 18 can be utilized as the hardware platform to facilitate the functionality of remote security operation center 400, local vehicle platform 410, or other joint edge vehicle platforms 440 as illustrated in FIG. 4, or the cloud architecture for remote security operation center 400 as illustrated in FIG. 13. Computer device 1805 in computing environment 1800 can include one or more processing units, cores, or processors 1810, memory 1815 (e.g., RAM, ROM, and/or the like), internal storage 1820 (e.g., magnetic, optical, solid state storage, and/or organic), and/or I/O interface 1825, any of which can be coupled on a communication mechanism or bus 1830 for communicating information or embedded in the computer device 1805.

Computer device 1805 can be communicatively coupled to input/user interface 1835 and output device/interface 1840. Either one or both of input/user interface 1835 and output device/interface 1840 can be a wired or wireless interface and can be detachable. Input/user interface 1835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1840 may include a display, television, monitor, printer, speaker, braille, or the like. In some example implementations, input/user interface 1835 and output device/interface 1840 can be embedded with or physically coupled to the computer device 1805. In other example implementations, other computer devices may function as or provide the functions of input/user interface 1835 and output device/interface 1840 for a computer device 1805.

Examples of computer device 1805 may include, but are not limited to, highly mobile devices (e.g., vehicle platforms may be configured as specialized devices for installation in vehicles or for integration in vehicle systems), mobile devices (e.g., tablets, notebooks, laptops, personal computers, and so on for cloud implementations), and devices not designed for mobility (e.g., desktop computers, cloud server systems, storage systems, specialized apparatuses for data analytics, and so on for cloud implementations).

Computer device 1805 can be communicatively coupled (e.g., via I/O interface 1825) to external storage 1845 and network 1850 for communicating with any number of networked components, devices, and systems, including one or more computer devices of the same or different configuration. Computer device 1805 or any connected computer device can be functioning as, providing services of, or referred to as a server, client, thin server, general machine, special-purpose machine, or another label.

I/O interface 1825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1800. Network 1850 can be any network or combination of networks (e.g., the Internet, local area network, wide area network, a telephonic network, a cellular network, satellite network, and the like).

Computer device 1805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1810 can execute under any operating system (OS) (not shown), in a native or virtual environment. One or more applications can be deployed that include logic unit 1860, application programming interface (API) unit 1865, input unit 1870, output unit 1875, and inter-unit communication mechanism 1895 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1865, it may be communicated to one or more other units (e.g., logic unit 1860, input unit 1870, output unit 1875). In some instances, logic unit 1860 may be configured to control the information flow among the units and direct the services provided by API unit 1865, input unit 1870, output unit 1875, in some example implementations described above. For example, the flow of one or more processes or implementations may be controlled by logic unit 1860 alone or in conjunction with API unit 1865. The input unit 1870 may be configured to obtain input for the calculations described in the example implementations, and the output unit 1875 may be configured to provide output based on the calculations described in example implementations.

In an example implementation of the configuration of computer device 1805 facilitating the functionality of remote security operation center 400, local vehicle platform 410, or other joint edge vehicle platforms 440 as illustrated in FIG. 4, memory 1815 can be configured to manage model management information associating each of a plurality of analytic models with one or more types of data associated with a vehicle, and an operation status of the vehicle as illustrated in FIG. 7 and as determined from data received from data modules as illustrated in FIG. 4. Such analytic models can involve models for advanced driver assistance system (ADAS), for vehicle in idle state, and for vehicle in driving state as illustrated in FIGS. 5 to 7 and are either historical analytic learning models or manufacturer provided models as illustrated in FIG. 4. Processor(s) 1810 can be configured to execute a model training function on the historical analytic learning models based on the received data as illustrated in FIG. 4.

In an example implementation of the configuration of computer device 1805 facilitating the functionality of a local vehicle platform 410 as illustrated in FIG. 4, processor(s) 1810 can be configured to, for received data associated with the vehicle and non-receipt of a report from another vehicle or a cloud, determine a type of the received data from the vehicle and the operation status of the vehicle; select one or more analytic models of the plurality of analytic models based on the determined type of the received data associated with the vehicle, the determined operation status of the vehicle, and the model management information; and execute the selected one or more analytic models on the received data to generate an anomaly determination of the received data as illustrated in the flow of FIG. 5 and as similarly illustrated in the flow of FIGS. 15 to 17. For the anomaly determination indicative of the received data being anomalous, processor(s) 1810 may further mark the received data as anomalous and generate an alert for the vehicle based on the received data as illustrated in FIG. 5. Similar functionality may be implemented in joint edge vehicle platforms 440 or remote security operation center 400 depending on the desired implementation.

In an example implementation of the configuration of computer device 1805 facilitating the functionality of a local vehicle platform 410 as illustrated in FIG. 4, processor(s) 1810 can be further configured to determine the operation status of the vehicle based on the received data as illustrated from FIG. 5, and determine the type of the received data from a processing of data from one of car area network (CAN) and vehicle Local Area Network (LAN) as illustrated in FIGS. 8(a) and 8(b). Thus, the received data can include Car Area Network (CAN) data or vehicle LAN data. Similar functionality may be implemented in joint edge vehicle platforms 440 or remote security operation center 400 depending on the desired implementation. Depending on the desired implementation, the received data utilized for determining the operation status of the vehicle can involve at least one of accelerometer data, global positioning satellite (GPS), road traffic data, and engine control unit (ECU) data as illustrated in FIG. 15.

In an example implementation of the configuration of computer device 1805 facilitating the functionality of a local vehicle platform 410 as illustrated in FIG. 4, processor(s) 1810 can be configured to, for receipt of an alert for the received data indicative of the received data being anomalous, modify a risk score associated with the received data, and for the risk score exceeding a threshold associated with the received data, activating a safety mode of the vehicle; and for receipt of the report from the cloud or from the another vehicle indicative of the received data being malicious, activate the safety mode of the vehicle as illustrated in FIG. 11. Similar functionality may be implemented in joint edge vehicle platforms 440 or remote security operation center 400 depending on the desired implementation.

In an example implementation of the configuration of computer device 1805 facilitating the functionality of a remote security operations center 400 as illustrated in FIG. 4, computing device 1805 can be communicatively coupled to the local vehicle platform 410 and joint edge vehicle platforms 440. Processor(s) 1810 can be configured to, for the received data being marked as anomalous, for a determination that the received data is not anomalous, provide to the vehicle, results generated from the cloud for the received data based on the selected one or more analytic models; and for a determination that the received data is anomalous, provide an anomaly report to a cloud database and to one or more other vehicles as illustrated in FIG. 12. Similar functionality may be implemented in joint edge vehicle platforms 440 or remote security operation center 400 depending on the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A non-transitory computer readable medium, storing instructions to execute a process, the process comprising:
    managing model management information associating each of a plurality of analytic models with one or more types of data associated with a vehicle, and an operation status of the vehicle;
    receiving data associated with the vehicle:
    for receipt of a report from another vehicle or a cloud indicative of the received data being high risk for being anomalous:
    reducing a risk threshold for anomaly analysis for the plurality of analytic models;
    for receipt of the report from the another vehicle or the cloud indicative of the received data being high risk for being anomalous, or non-receipt of the report from the another vehicle or the cloud:
    determining a type of the received data from the vehicle and the operation status of the vehicle;
    selecting one or more analytic models of the plurality of analytic models based on the determined type of the received data associated with the vehicle, the determined operation status of the vehicle, and the model management information; and
    executing the selected one or more analytic models on the received data to generate an anomaly determination of the received data;
    for receipt of the report from the another vehicle or the cloud indicative of the received data being malicious, marking the received data as anomalous; and
    for receipt of the report from the another vehicle or the cloud indicative of the received data being safe, marking the received data as safe.

2. The non-transitory computer readable medium of claim 1, the process further comprising, for the anomaly determination indicative of the received data being anomalous, marking the received data as anomalous and generating an alert for the vehicle based on the received data.

3. The non-transitory computer readable medium of claim 1, the process further comprising: determining the operation status of the vehicle based on the received data; and determining the type of the received data from a processing of data from one of car area network (CAN) and vehicle Local Area Network (LAN).

4. The non-transitory computer readable medium of claim 3, wherein the received data utilized for determining the operation status of the vehicle comprises at least one of accelerometer data, global positioning satellite (GPS), road traffic data, and engine control unit (ECU) data.

5. The non-transitory computer readable medium of claim 1, wherein the plurality of analytic models comprises an analytic model for advanced driver assistance system (ADAS), an analytic model for vehicle in idle state, and an analytic model for vehicle in driving state.

6. The non-transitory computer readable medium of claim 1, wherein the received data comprises Car Area Network (CAN) data, and wherein the plurality of analytic models comprises historical analytic learning models and manufacturer provided models.

7. The non-transitory computer readable medium of claim 6, the process further comprising executing a model training function on the historical analytic learning models based on the received data.

8. The non-transitory computer readable medium of claim 1, wherein the non-transitory computer readable medium is stored in the vehicle, wherein the process is executed by one or more processors of the vehicle.

9. The non-transitory computer readable medium of claim 1, the process further comprising: for the received data being marked as anomalous: for a determination by the cloud that the received data is not anomalous: providing to the vehicle, results generated from the cloud for the received data based on the selected one or more analytic models; for a determination by the cloud that the received data is anomalous: providing an anomaly report to a cloud database and to one or more other vehicles.

10. The non-transitory computer readable medium of claim 1, the process further comprising: for receipt of an alert for the received data indicative of the received data being anomalous: modifying a risk score associated with the received data, and for the risk score exceeding a threshold associated with the received data, activating a safety mode of the vehicle; for receipt of the report from the cloud or from the another vehicle indicative of the received data being malicious, activating the safety mode of the vehicle.

11. A system comprising:
a vehicle platform comprising:
a memory configured to manage model management information associating each of a plurality of analytic models with one or more types of data associated with a vehicle, and an operation status of the vehicle; and
a processor, configured to, receive data associated with the vehicle:
for receipt of a report from another vehicle or a cloud indicative of the received data being high risk for being anomalous:
reduce a risk threshold for anomaly analysis for the plurality of analytic models;
for receipt of the report from the another vehicle or the cloud indicative of the received data being high risk for being anomalous, or non-receipt of the report from the another vehicle or the cloud:
determine a type of the received data from the vehicle and the operation status of the vehicle;
select one or more analytic models of the plurality of analytic models based on the determined type of the received data associated with the vehicle, the determined operation status of the vehicle, and the model management information; and execute the selected one or more analytic models on the received data to generate an anomaly determination of the received data;
for receipt of the report from the another vehicle or the cloud indicative of the received data being malicious, mark the received data as anomalous; and
for receipt of the report from the another vehicle or the cloud indicative of the received data being safe, mark the received data as safe.

12. The system of claim 11, wherein the processor is configured to, for the anomaly determination indicative of the received data being anomalous, mark the received data as anomalous and generate an alert for the vehicle based on the received data.

13. The system of claim 11, wherein the processor is further configured to:
determine the operation status of the vehicle based on the received data; and
determine the type of the received data from a processing of data from one of car area network (CAN) and vehicle Local Area Network (LAN).

14. The system of claim 13, wherein the received data utilized for determining the operation status of the vehicle comprises at least one of accelerometer data, global positioning satellite (GPS), road traffic data, and engine control unit (ECU) data.

15. The system of claim 11, wherein the plurality of analytic models comprises an analytic model for advanced driver assistance system (ADAS), an analytic model for vehicle in idle state, and an analytic model for vehicle in driving state.

16. The system of claim 11, wherein the received data comprises Car Area Network (CAN) data, and wherein the plurality of analytic models comprises historical analytic learning models and manufacturer provided models.

17. The system of claim 16, wherein the processor is configured to execute a model training function on the historical analytic learning models based on the received data.

18. The system of claim 11, wherein the vehicle platform is stored in the vehicle.

19. The system of claim 11, further comprising an apparatus communicatively coupled to the vehicle platform, the apparatus comprising:
a processor, configured to, for the received data being marked as anomalous:
for a determination that the received data is not anomalous:
provide to the vehicle, generated results from the apparatus for the received data based on the selected one or more analytic models;
for a determination that the received data is anomalous:
provide an anomaly report to a cloud database and to one or more other vehicles.

20. The system of claim 11, wherein the processor is further configured to:
for receipt of an alert for the received data indicative of the received data being anomalous:
modify a risk score associated with the received data, and for the risk score exceeding a threshold associated with the received data, activating a safety mode of the vehicle;
for receipt of the report from the cloud or from the another vehicle indicative of the received data being malicious, activate the safety mode of the vehicle.

* * * * *